United States Patent [19]
Bennett

[11] Patent Number: 5,688,017
[45] Date of Patent: Nov. 18, 1997

[54] METHOD AND APPARATUS FOR MOUNTING FRAMED TONNEAU COVER

[76] Inventor: Bruce A. Bennett, 12451 Brick Rd., Granger, Ind. 46530

[21] Appl. No.: 488,519

[22] Filed: Jun. 7, 1995

[51] Int. Cl.[6] ............................................. B60P 7/02
[52] U.S. Cl. ............................................. 296/100
[58] Field of Search ................................ 296/100

[56] References Cited

U.S. PATENT DOCUMENTS

| | | | |
|---|---|---|---|
| 1,718,183 | 6/1929 | Smith | 296/100 |
| 3,762,763 | 10/1973 | Deshores | 296/100 |
| 3,785,698 | 1/1974 | Dean et al. | 296/100 |
| 3,923,334 | 12/1975 | Key | 296/100 |
| 4,079,989 | 3/1978 | Robertson | 296/100 |
| 4,273,377 | 6/1981 | Alexander | 296/100 |
| 4,889,381 | 12/1989 | Tamblyn et al. | 296/100 |
| 5,121,960 | 6/1992 | Wheatley | 296/100 |
| 5,165,750 | 11/1992 | Pirhonen | 296/100 |
| 5,228,736 | 7/1993 | Dutton | 296/100 |
| 5,263,761 | 11/1993 | Hathaway et al. | 296/100 |
| 5,275,458 | 1/1994 | Barben et al. | 296/100 |
| 5,472,256 | 12/1995 | Tucker | 296/100 |
| 5,540,475 | 7/1996 | Kersting et al. | 296/100 |

*Primary Examiner*—Gary C. Hoge
*Attorney, Agent, or Firm*—Ryan M. Fountain

[57] ABSTRACT

An underlying frame structure is provided for mounting a rigid tonneau to the cargo bed of a vehicle, such as a pick up truck. The frame structure includes a plurality of rails having an integral "t" slot extruded therein to receive mating clamping elements as well as conventional fasteners. The tonneau completely overlays the frame structure and is held in a close, spaced relation from the vehicle by the frame.

1 Claim, 5 Drawing Sheets

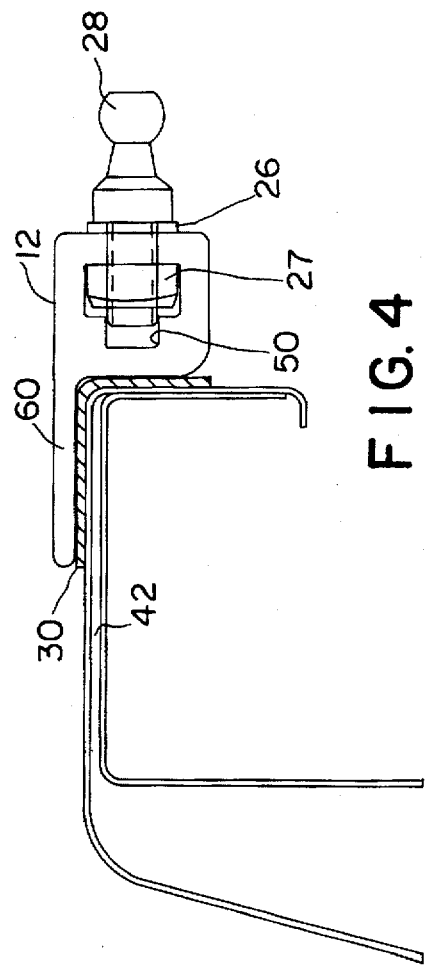
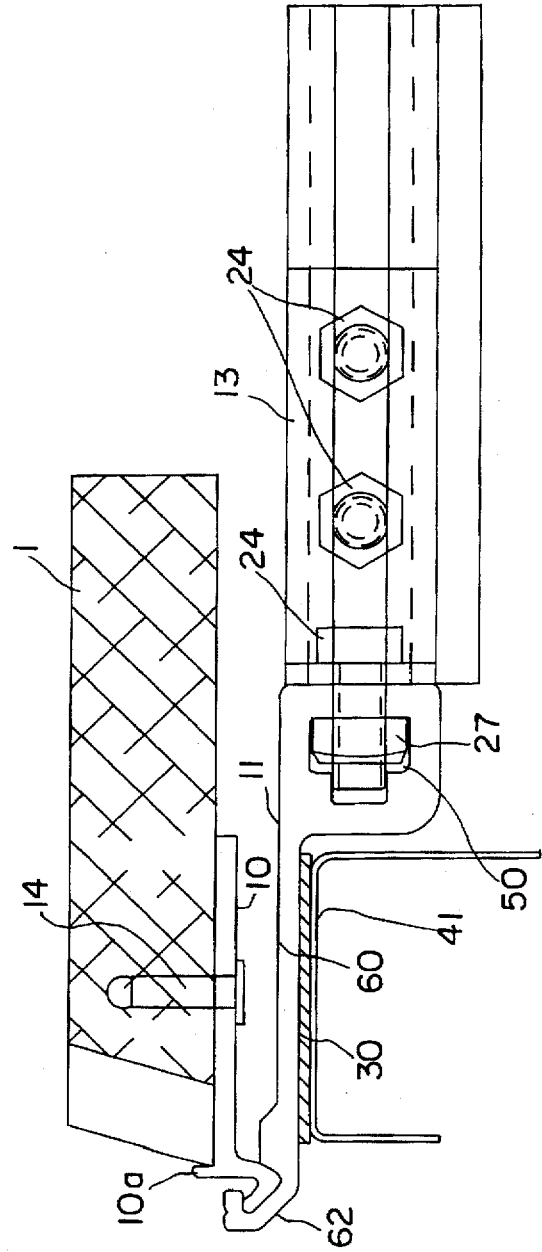

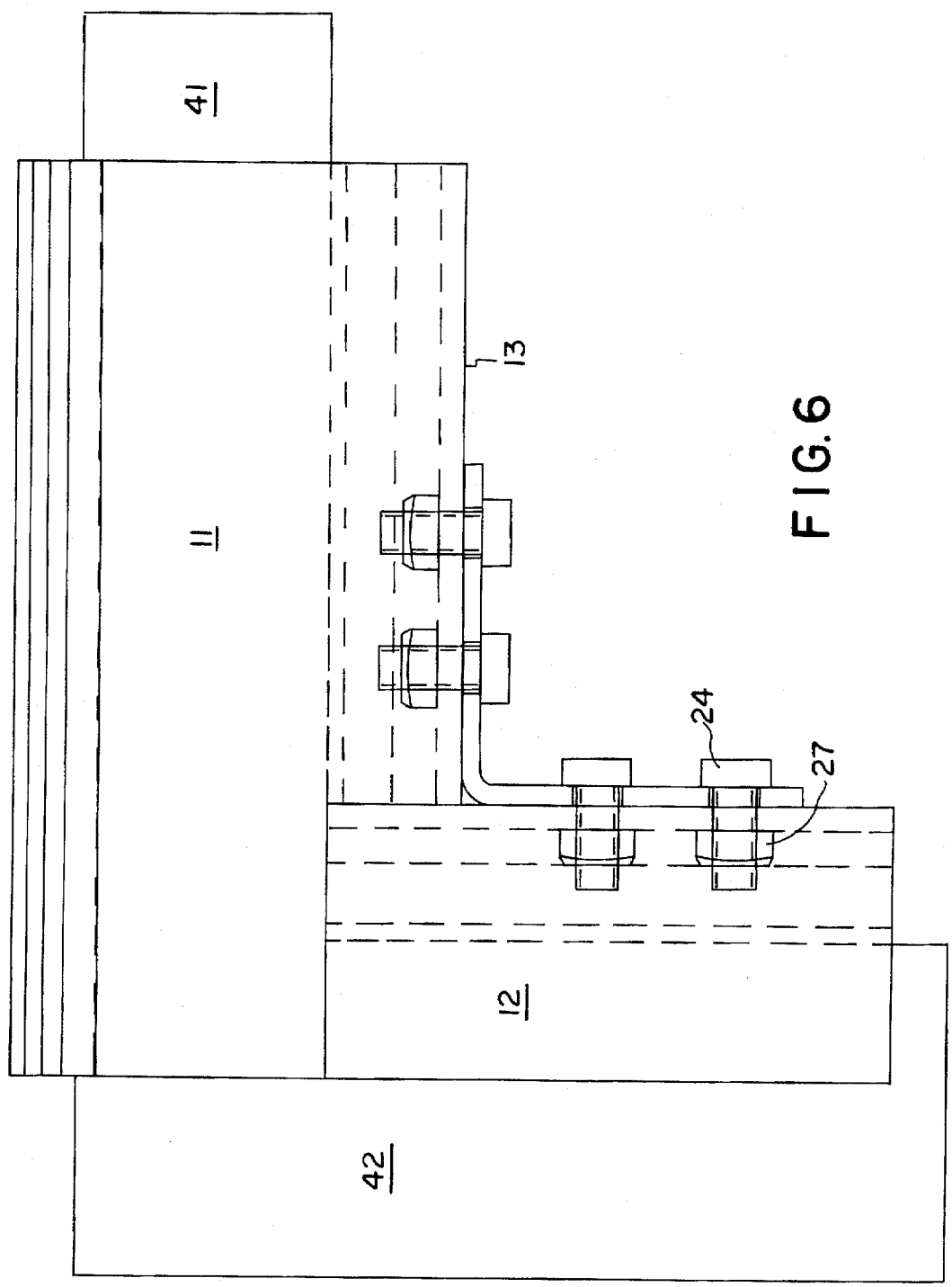

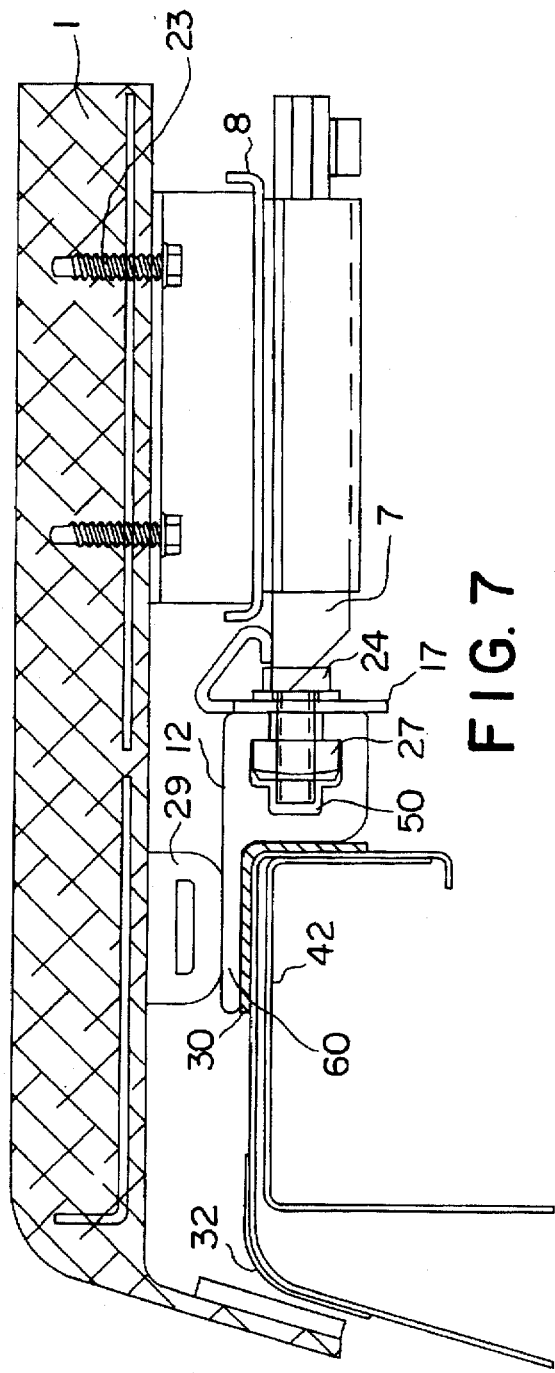
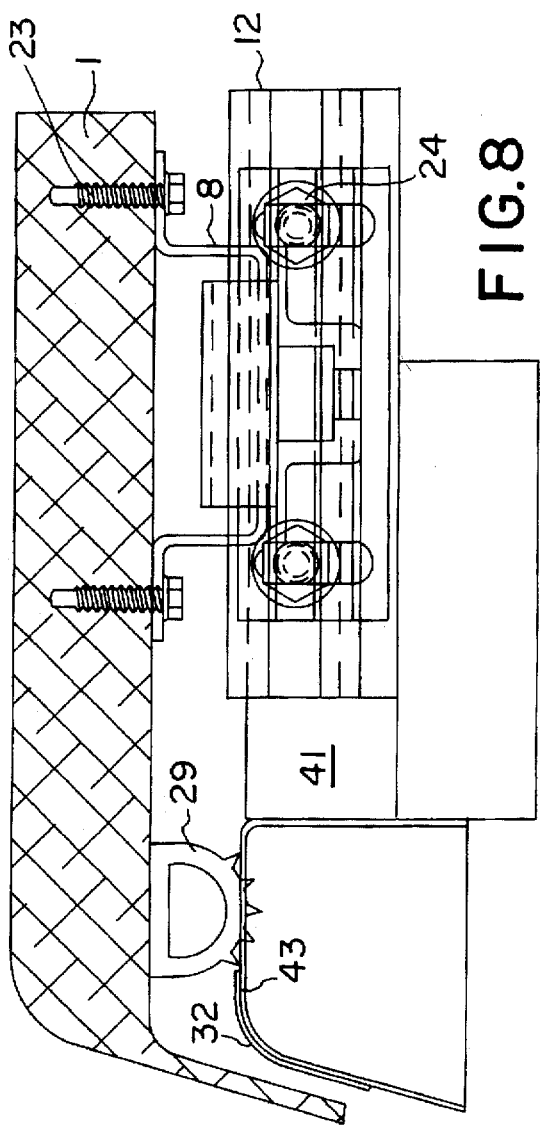

METHOD AND APPARATUS FOR MOUNTING FRAMED TONNEAU COVER

BACKGROUND AND SUMMARY OF THE INVENTION

The present invention relates to covers for the bed of a pick up truck, and, more particularly, to tonneau covers mounted on the cargo area of vehicles.

Certain motor vehicles, such as pick up trucks and the like, are constructed with an exterior cargo area or bed, usually toward the rear of the vehicle, behind the cab for the driver or other occupants. Such cargo beds can be convenient and readily accessible. However, in the vehicle as provided by the original manufacturer, the bed is typically exposed to the elements. Thus, any cargo within the bed would also be exposed to the elements while being transported or stored in the bed. Also, it has been found that the fuel economy of pick up trucks can be adversely affected by the wind resistance or drag of the exposed cargo bed.

In response to such disadvantages, pick up trucks users have previously mounted rigid caps, typically molded from fiberglass, over the cargo bed. These caps appear to form an extension of the driver cab by effectively adding height and a roof to the cargo bed. Often, however, caps are relatively expensive and too heavy and/or bulky for quick removal if oversized cargo is to be hauled. In addition, some caps interfere with the driver's rearward visibility. As an alternative, light weight, flexible tarps or tonneau covers have been secured to the top rails of the cargo bed. These are typically easy to remove and relatively inexpensive, but are less durable and more prone to damage. Another alternative, rigid tonneau covers molded from fiberglass, often called "lids," has been suggested as having the durability of caps, but the removability of tarps. In general, lids also cost significantly less than caps.

A variety of lids have been constructed, and numerous factors determine the relative desirability of each lid design. For example, it has generally been found to be advantageous for the lid to match the styling of the pick up truck and appear to be an integral part of it. In that regard, it is preferable for the lid to present as low a profile as possible to the vehicle front and side rails and tailgate surrounding the bed. Previously, removable and pop-up style lids have been mounted to the vehicle by an underlying frame that is secured by C-clamps to the vehicle side rails. Since the C-clamps engage over the frame, those lids must project above the vehicle side rails by at least the height of the C-clamp that rests on the lid frame plus the thickness of the frame and tonneau elements.

At the same time, its functional capability in terms of reliable mounting, secure latching and locking, low maintenance, sturdy and reliable hinge operation, ease of removal, and water tight sealing are usually important factors in lid desirability. Since there are several different cargo bed configurations on the market both within a given pick up truck model year and over the passage of several years, flexibility of installation is especially important because availability of standardized fittings and installation can keep manufacturing costs conveniently low.

Also, since there is the potential for a variety of other fixtures, such as bed liners, cargo boxes, specialty brackets, etc., to be mounted to the cargo bed as well, it is advantageous for the lid to avoid interfering with attachment or utilization of these items. In addition, given that lids are frequently intended to be removable for extended periods of time, whatever mounting devices are used should avoid penetrating the walls and rails of the cargo bed (and thereby exposing the interior walls of the vehicle to corrosion).

Accordingly, it is an object of the present invention to provide an improved construction and method of installation for rigid tonneau covers. Other objects include the provision of a lid which:

1. is light weight and inexpensive to manufacture,
2. minimizes the potential for scratching the vehicle paint during use,
3. supports a variety of conventional accessories,
4. is watertight and securely attachable to the cargo bed,
5. has low maintenance requirements and easy serviceability,
6. is readily adaptable to a wide variety of pick up truck cargo beds, and
7. maintains a low profile over the vehicle cargo bed.

These and other objects of the present invention are attained by the provision of a framed mounting structure underlying a removable, pop-up style lid cover or tonneau which includes an integrally formed "t" slot, projecting no higher than the vehicle side rails about the cargo bed, for receiving retaining clamps and conventional bracket assemblies at selectable locations. Retaining clamps are formed with a mating "t" projection for organic engagement with the t slot to minimize the profile of the lid above the vehicle side rails. Also, this "t" slot is sized, for example, to receive within it a conventional square nuts and the penetrating end of an associated bolt. The front rail hinge for the lid cover is formed as an extension of the "t" slot frame. The lid cover completely overlies the framed mounting structure and is held in spaced relation from the vehicle side rails.

Other objects, advantages and novel features of the present invention will become readily apparent from the drawings and detailed description below.

BRIEF DESCRIPTION OF THE DRAWINGS

FIG. 4 shows an enlarged, cross sectional view of the hinge prop to lid frame mounting of FIG. 1.

FIG. 5 shows an enlarged, cross sectional view of the lid frame hinge of FIG. 1 as positioned on the vehicle front rail of the cargo bed.

FIG. 6 shows a top plan view of an enlargement of the lid frame of FIG. 1 at the left junction of the front and side lid frame rails.

FIG. 7 shows an enlarged, cross sectional view of the lid assembly of FIG. 1 at the rear of the left cargo bed side rail, immediately forward of the cargo bed tail gate.

FIG. 8 shows a cross sectional view of the lid assembly of FIG. 1 across the tail gate of the cargo bed.

DESCRIPTION OF PREFERRED EMBODIMENTS

Figure 1:
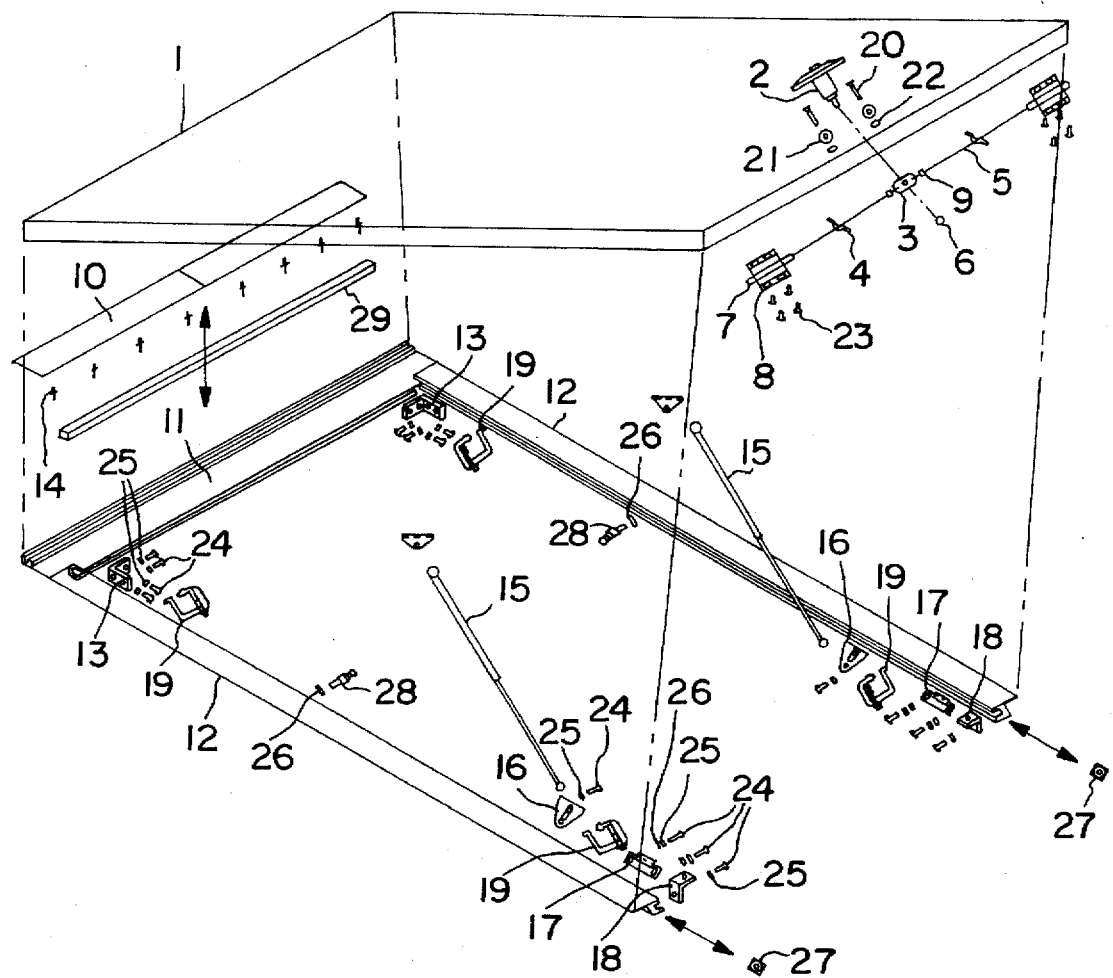
FIG. 1 shows an exploded perspective view from the top, left, rear portion of a lid assembly incorporating the present invention.

FIG. 1 illustrates a preferred embodiment of the present invention represented by lid TSC600F, particularly for use on a pick up truck cargo bed. Throughout the drawings, like numbers indicate like elements. The various cross sectional views are enlarged to the degree needed for discussion of that aspect, but are not necessarily to scale with respect to each other. Lid TSC600F includes tonneau 1, preferably formed from molded fiberglass, having a conventional, pop up T handle assembly 2 adjacent its rear edge. Although tonneau 1 is shown in the drawings to be generally flat over its top surface, alternative embodiments can, for example, include a slight side to side curve and/or a rear flair, as desired either for styling or structural rigidity. This assembly is, for example, mounted to tonneau 1 via flat screws 20, washers 21 and locknuts 22. Steel locking cam plate 3 is disposed under tonneau 1 and connected to handle assembly 2. Lock assembly cable 5 is connected to each side of plate 3 and guided to the sides of tonneau 1 by retainer brackets 4 mounted onto the underside of tonneau 1. Alternatively, rigid rods can be used instead of cables 5 and brackets 4. Handle assembly 2 is, for example, secured to plate 3 by a conventional pushnut cam retainer 6. Where desired, handle assembly 2 can incorporate a conventional keyed locking assembly as an alternative to a mere latch closure.

Cable 5 is connected at each end opposite plate 3 to a slam latch plunger bolt 7. These bolts are slidably mounted in offset brackets 8, mounted to the underside of tonneau 1 via tek screws 23, but spaced downwardly from the tonneau at the point where bolts 7 are received. As is conventional, cables 5 are preferably tensioned as desired and held to proper length by crimp sleeves 9.

At the front end of tonneau 1, male hinge member 10 is mounted to the tonneau underside by a plurality of fasteners, such as steel rivets 14. Female hinge member 11 is disposed below male hinge member 10 and releasably receives the front edge thereof such that the hinge members can open and close relative to each other and to allow tonneau 1 to be temporarily removed from its frame. In the embodiment shown, male hinge member 10 includes a stop element 10a to squarely align the front of tonneau 1. Further, hinge members 10 and 11 are formed to separate when opened past 45 degrees from the horizontal frame of reference in FIG. 5.

Female hinge member 11 serves as the front rail for the lid frame. Hinge members 10 and 11 are preferably formed as aluminum extrusions having substantially the same width as the inside width of the cargo bed. Left and right side lid frame rails 12, also preferably formed as aluminum extrusions, are connected to female hinge member 11 at the front of the cargo bed by corner brackets 13. These corner brackets can be adjustably positioned within the frame rails to fit different styles and sizes of cargo beds in the manner discussed below.

In the middle area of the sides of tonneau 1 a pair of struts 15 are mounted to support the tonneau when it is in a hinged, open (or "pop-up") position on the cargo bed. Conventional gas filled prop struts can be used for this purpose and are preferably mounted at one end to the underside of the tonneau. Prop brackets 16 are provided to attach the other end of struts 15 to each side rail 12 of the lid frame.

Striker plates 17 are mounted to each of side rails 12 at locations adjacent to and operably associated with plunger bolts 7. During operation of the latching or locking system of the lid, rotation of T handle assembly 2 causes plate 3 to pull cable 5 inwardly away from the vehicle side rails. Since these cables are attached to bolts 7, the bolts also travel inwardly. However, counter rotation of T handle assembly 2 causes bolts 7 to move outwardly to receive and engage a portion of striker plates 17. As shown in FIG. 7, for example, bolts 7 engage by sliding under a portion of striker plates 17 and thereby prevent opening of tonneau 1 with respect to the lid frame rails. In a conventional manner, the counter rotation of the T handle assembly can be accomplished, for example, by spring biasing of bolts 7 within brackets 8 such that a "slam latch" is provided.

A plurality of frame clamps 19 are provided to secure side rails 12 to the vehicle bed. Clamps 19 are, for example, spaced along side rails 12 at the forward and rear portions of the length of each rail. Depending upon the length of the vehicle bed, two or three such clamps would preferably be employed.

Corner brackets 13, prop bracket 16 and striker plates 17 are each preferably mounted to side rails 12 via conventional bolts 24, and crowned square nuts 27. Lock washers 25 and flat washers 26 of conventional nature can also be used when desired. Preferably, side rails 12 are sized to receive 5/16×3/4 inch bolts 24 and 5/16 inch nuts 27. Various other accessory and/or shipping brackets 18 can be mounted to side rails 12 in the same manner. Also, a threaded ball stud 28 can be mounted to side rails 12 in like manner to retain the end of strut 15 normally connected to tonneau 1 if the tonneau is temporarily removed from its frame, such as to enable high loads to be carried in the vehicle bed, or when transporting the lid prior to installation on a vehicle.

Bulb seal 29 is provided to the underside of tonneau 1 facing the lid frame rail members at the front and sides of tonneau 1 and facing the top of the tailgate of the vehicle at the rear of tonneau 1. This bulb seal can be of conventional design and materials and serves to provide a watertight seal and closure cushioning between tonneau 1 and the vehicle. As shown in FIG. 8, the bulb seal at the vehicle tailgate can be formed distinctly from the bulb seal used elsewhere.

As shown in FIGS. 2, 3, 5 and 7, in mounting front rail 11 and side rails 12 of the lid to front rail 41 and side rail 42 of the vehicle cargo bed, a strip of foam tape 30 can be applied between the associated rails. Similarly, a strip of Mylar tape 32 is advantageously applied to the top of vehicle tailgate 43 and to front rail 41 and side rails 42 adjacent to the edges of tonneau 1, as shown in FIGS. 7 and 8, in order to provide protection against vehicle paint scratching or nicking.

Lid front rail 11 and side rails 12 are each formed with an integral "t" shaped slot 50 therein for slidably receiving clamps 19, portions of bolts 24 and all of nuts 27. Preferably, this t slot is extruded along the entire length of each rail with an extended flange 60 forming the portion of the rail which actually overlays the vehicle rails. Preferably, the t slot portion is formed to project no higher above the vehicle front and side rails when mounted on the vehicle than flange 60. Front rail 11 is shown with the t slot formed on one side of flange 60 and hinging element 62 formed on the other side.

Figure 2:
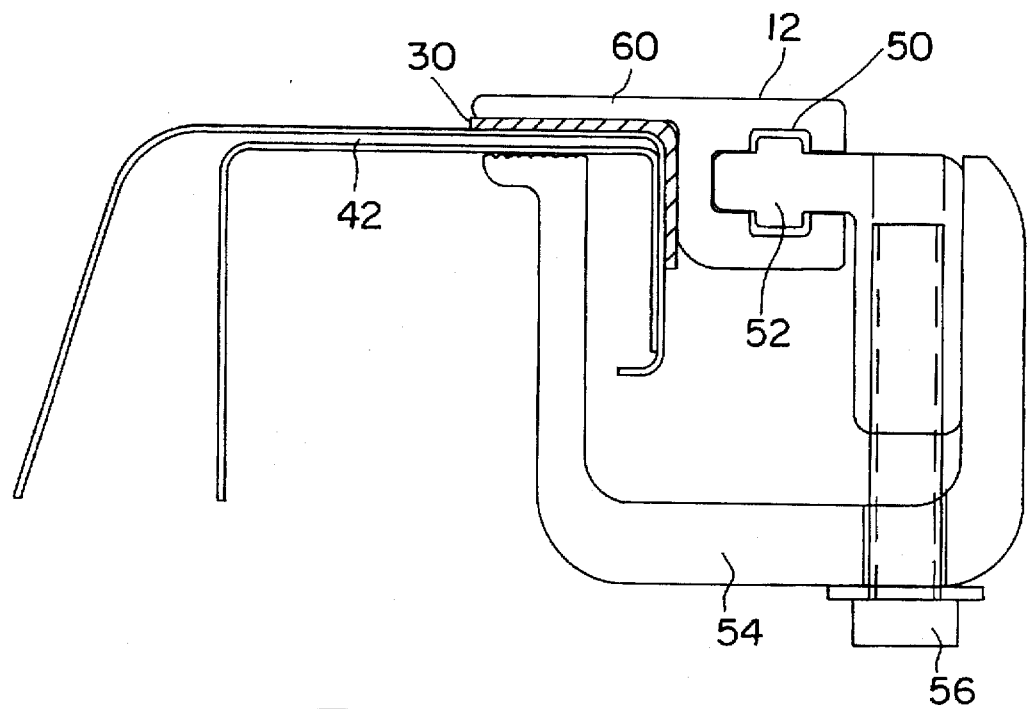
FIG. 2 shows an enlarged, cross sectional view of the lid frame of FIG. 1 as clamped to the side rail of the cargo bed.
Figure 3:
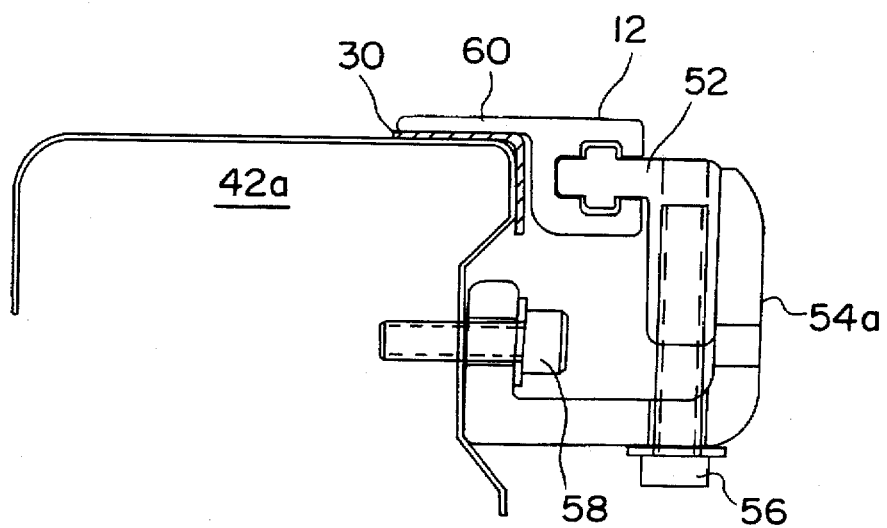
FIG. 3 shows an enlarged, cross sectional view corresponding to FIG. 2, but using an alternative clamp assembly with a different style vehicle side rail.

As shown in FIG. 2, clamps 19 can include three separable elements: "t" nut 52, arm 54 and bolt 56. Each t nut 52 is sized to fit closely but slidably into t slot 50 so as to serve as a fastener to retain the lid rail to the vehicle rail. Preferably, t nuts 52 are dimensioned so as to avoid projecting above flange 60 when disposed within t slots 50. Arms 54 engage the underside of side rail 42 and are secured to t nut 52 by bolt 56. Alternatively, as shown in FIG. 3, arm 54a can be formed to locate a retaining bolt 58 for penetration of side wall 42a of the vehicle cargo bed.

Typically, nuts 27 and t nuts 52 are slid into t slots 50 from a convenient end of front rail 11 or side rail 12 and then, when positioned where desired, the associated bolts 24 or 56 are tightened to hold the nuts in place. The t slots are advantageously dimensioned to closely receive a portion of bolts 24 which protrudes or penetrates though nuts 27 as the bolts are tightened onto the nuts.

A number of advantages are, thus, obtained by use of the present invention. For example, in addition to ease of mounting because of the adjustable positioning of clamps 19 onto side rails 12, this framed lid structure permits front rail 11 to slide over front rail 41 as needed to accommodate proper positioning of tonneau 1 at the tailgate in various size cargo beds. Careful positioning at the tailgate is typically more important than at front rail 41 because locking of both the tonneau cover and the tailgate typically occur at the rear of the cargo bed. Also, there is often a gap between the cargo bed and the vehicle cab which can accept some degree of tonneau cover overhang without difficulty.

Further, bracket 13 permits adjustment of the position of side rails 12 to accommodate various cargo bed widths and vehicle side rail configurations. In addition, the t slots of this invention will similarly retain brackets for mounting of other accessories under the lid, such as tool boxes. Integrally forming t slots 50 with an extended flange 60 and using mating t nuts joins the framing and clamping functions and permits a low profile for the overall lid: all necessary hardware connections are below the top level of the vehicle rails and into the cargo bed enclosure itself. Nonetheless, the tonneau itself is held in spaced relation from the vehicle by the frame in order to minimize the potential for dents and scratching as the tonneau is periodicly opened and closed.

Although the present invention has been described above in detail with respect to preferred embodiments known at this time, that is by way of illustration and example only. The spirit and scope of this invention are to be limited only by the terms of the claims defined below.

What I claim is:

1. A cover arrangement for the bed of a pick up truck comprising:

a rigid tonneau member, a frame assembly for removably attaching the tonneau member to the truck, that frame assembly having at least one rail element to be clamped to a portion of the truck, that rail element including a "t" shaped slot therein for slidably receiving at least one fastener for retaining the rail element to the portion of the truck, and wherein the t shaped slot is formed to extend along at least a portion of the length of the rail element, and conventional nut and bolt fasteners are provided for retention of other accessory structures to that rail element by insertion of said fasteners into the t shaped slot.

* * * * *